United States Patent [19]

Simon

[11] Patent Number: 4,987,041

[45] Date of Patent: Jan. 22, 1991

[54] SEALED NICKEL-CADMIUM BATTERY

[75] Inventor: Gerhard Simon, Kelkheim, Fed. Rep. of Germany

[73] Assignee: Varta Batterie Aktiengesellschaft, Hanover, Fed. Rep. of Germany

[21] Appl. No.: 455,806

[22] Filed: Dec. 21, 1989

Related U.S. Application Data

[63] Continuation of Ser. No. 771,939, Sep. 3, 1985, abandoned.

[30] Foreign Application Priority Data

Sep. 13, 1984 [DE] Fed. Rep. of Germany ....... 3433544

[51] Int. Cl.$^5$ ..................... H01M 4/36; H01M 10/52
[52] U.S. Cl. ..................................... 429/59; 429/222; 429/223
[58] Field of Search ................... 429/59, 57, 222, 223, 429/217, 218

[56] References Cited

U.S. PATENT DOCUMENTS

| | | | |
|---|---|---|---|
| 3,877,985 | 4/1975 | Rampel | 429/59 |
| 3,966,494 | 6/1976 | O'Sullivan | 429/222 |
| 4,142,025 | 2/1979 | Ritterman | 429/222 X |
| 4,215,190 | 7/1980 | Ferrando et al. | 429/222 |
| 4,224,392 | 9/1980 | Oswin | 429/222 X |
| 4,246,326 | 1/1981 | Sprengel et al. | 429/59 |

*Primary Examiner*—Anthony Skapars
*Attorney, Agent, or Firm*—Weiser & Stapler

[57] ABSTRACT

Overcharge protection, and especially the chargeability of a sealed Ni/Cd battery with high currents (up to 1 CA) is improved by rolling a carbon-containing powdered material into the surface of the negative electrode, which material catalyzes the reduction of oxygen. Wetting of the electrode with a "Tylose" dispersion prior to application of the powder (by powdering, vibration or in an agitator) improves the adhesion of the powder. The cadmium electrode thus prepared combines in itself the functions of a negative principal electrode and of an auxiliary oxygen electrode.

4 Claims, No Drawings

SEALED NICKEL-CADMIUM BATTERY

This application is a continuation, of application Ser. No. 06/771,939, filed Sept. 3, 1985, now abandoned.

BACKGROUND OF THE INVENTION

The present invention relates generally to nickel-cadmium batteries, and in particular, to a sealed nickel-cadmium battery comprising porous electrodes of opposite polarity with a porous separator between them.

Sealed nickel-cadmium batteries cannot be operated without running the risk of electrochemical reduction of oxygen developing during overcharge. However, auxiliary electrodes can be used as a means for controlling this reduction. Moreover, since these auxiliary electrodes are often provided with an independent current lead, they can also be used to detect oxygen and hydrogen, or to assume the function of a reference electrode, for example, to provide a signal indicating that full charge has been reached when a preset potential threshold is exceeded.

Auxiliary electrodes serving as oxygen-consuming electrodes are preferably porous in order to present the largest possible surface for oxygen reduction. To set the potential necessary for this, it is sufficient to electrically short-circuit such electrodes with the negative electrode of the battery.

Presently available auxiliary oxygen electrodes generally consist of a practically inert metal, having a lattice-shaped or net-shaped design, or a porous fabric or plastic structure into which suitable catalysts are embedded. The surface of the resulting electrode is preferably positioned immediately adjacent to the negative electrode of the battery. As is known from DE-OS 28 26 780, if desired, the auxiliary electrode can be provided with a hydrophilic layer facing toward the principal electrode, for catalyzing the oxygen reduction, and a hydrophobic layer facing away from the principal electrode, according to the principle of an air cathode. In view of the fact that oxygen reduction must take place at the gas-electrolyte-solid three-phase boundary, the catalyst material, which usually contains carbon or silver, is capable of being arranged in the gas space, or at least near the gas space, at least in cells with free electrolyte.

It has been found that in sealed nickel-cadmium sintered cells (round cells), when the cell is carefully balanced (i.e., the charging and discharging reserves are correct), the sintered nickel skeleton which is exposed in some areas on the edges of the cadmium electrode so strongly influences the oxygen turnover that such cells can be operated safe from overcharge even without additional measures to support any oxygen consumption. However, a marked impairment of the oxygen-consumption mechanism is presented when the negative sintered electrodes are replaced by cadmium electrodes of a different structure, such as the so-called electro-deposit type.

Electrodes of this type are manufactured according to a special process such as is described in DE-OS 28 22 821, wherein a perforated nickel strip is first coated with cadmium, in an electrolyte bath within which is dissolved a cadmium salt; and thereafter passed between calender rollers located outside of the electrolyte trough, so that the initially powdery and poorly adhering active metal layer is strengthened. Such cadmium electrodes, as well as other pressed cadmium electrodes, have certain disadvantages as compared with sintered electrodes concerning their ability to withstand rapid current-consumption.

It is therefore the object of the present invention to improve the chargeability of batteries of this type, with high currents.

SUMMARY OF THE INVENTION

This and other objects are accomplished according to the present invention by providing at least one surface of the negative electrode of a sealed nickel-cadmium battery with a coating of a uniformly distributed carbon-containing material which catalyzes the oxygen consumption.

A special advantage of the present invention is that the negative electrode is capable of direct preparation in the manufacturing process, ultimately combining the active electrode function and the function of an oxygen-consuming auxiliary electrode on the coated surface. As a result, it becomes unnecessary to insert a separate auxiliary oxygen electrode between the principal electrodes of the battery, avoiding the need to separately manufacture such an auxiliary electrode.

DETAILED DESCRIPTION OF A PREFERRED EMBODIMENT

The negative electrode of a nickel-cadmium cell is provided, on at least one of its surfaces, with a carbon-containing catalyst material which uniformly coats the electrode surface, and which is present in a quantity of from 0.2 to 0.8 $g/dm^2$ (for one surface), and preferably in a quantity of 0.4 $g/dm^2$. It has been found that this latter quantity alters the surface condition of the negative electrode only to such an extent that no difference in quality can be observed in comparing cells according to the present invention with cells without a catalyzed negative electrode during discharge of the cells at high currents of up to $i=10$ CA; and that cells according to the present invention can be charged at $i=1$ CA without the build-up of unacceptably high oxygen pressures.

A certain degree of "packing" of the electrode surface has been found to occur for coatings with the preferred quantity of 0.4 g. mass to be consumed per $dm^2$. This degree of packing must be low enough to maintain high-current dischargeability, but must also be high enough to promote oxygen consumption. Moreover, oxygen consumption is increasingly retarded at high currents as a consequence of the already considerable polarization of the cadmium electrode. Thus, there is a greater risk that the lagging oxygen consumption will be overcompensated by the incipient development of hydrogen at the cadmium electrode.

If chargeability with high currents is not required for an intended application, the amount of the mass to be consumed can be reduced. However, the mass to be consumed is preferably increased when high-current chargeability is of interest, but high-current dischargeability is not required.

In a particularly preferred embodiment, the carbon-containing consumable mass is a dry powder in its original form, and is comprised of about 58 to 72 wt. % activated carbon, 8 to 12 wt. % carbon black and 22 to 28 wt. % PTFE. The cadmium electrode is first treated with this material by uniform strewing or powdering, followed by calendering of the deposit into the electrode surface. Vibratory batchers or an electrostatically operated agitator can be used to apply the mass in a high-output, automated production process.

It is especially favorable to wet the electrode with a "Tylose" dispersion prior to powdering. ("Tylose" is a trademark for water-soluble cellulose ethers which are generally used as thickeners, binders and suspending agents; their being two classes of "Tylose" cellulose ethers including the methyl celluloses and the carboxymethyl celluloses). On the one hand, this measure has the advantage that "Tylose" inhibits aging of the mass. On the other hand, "Tylose" acts as an adhesive, which prevents resuspension and guarantees the quality of the electrode for a longer period of time.

The surface structure of the cadmium electrode according to the present invention can be conceptualized macroscopically as a patchwork in which irregularly shaped "islands" of the carbon-containing material alternate with similar "islands" of exposed cadmium or cadmium hydroxide in a random distribution. In view of the fact that the consumable mass is comprised of hydrophilic components such as activated carbon and carbon black on the one hand, and of PTFE, a hydrophobic component, on the other hand, each individual particle is essentially hydrophilic and hydrophobic at the same time. Thus, the conditions present at any point of the electrode surface, and ultimately in the immediate vicinity of every single cadmium particle, are favorable both for the actual electrode reaction and for the functioning of the oxygen-consumption process; conditions which are absent in previously available layer-like devices for oxygen consumption wherein more extensive hydrophilic and hydrophobic areas are positioned at greater distances from each other, and from the active cadmium of such devices.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A gas-tight, sealed nickel-cadmium storage battery comprising porous positive and negative electrodes and porous separators disposed between the porous electrodes, wherein surface portions of the negative electrodes are coated with an active carbon-containing material for catalytic oxygen recombination in an amount of from 0.2 to 0.8 $g/dm^2$ such that said surface portions form islands of said carbon-containing material and islands of exposed cadmium or cadmium hydroxide, in a random distribution.

2. The battery of claim 1 wherein said quantity is 0.4 $g/dm^2$.

3. The battery of claim 1 wherein the carbon-containing material is a powdered mixture comprised of about 58-72 wt. % activated carbon, 8-12 wt. % carbon black and 22-28 wt. % PTFE.

4. The battery of claim 1 wherein the negative electrode is a cadmium electrode prepared by cathodic metal deposition from a cadmium salt solution.

* * * * *